US012796881B2

(12) United States Patent
Sun et al.

(10) Patent No.: US 12,796,881 B2
(45) Date of Patent: Nov. 17, 2026

(54) CLEANING ROBOT CONTROL METHOD AND APPARATUS, CLEANING ROBOT, AND STORAGE MEDIUM

(71) Applicant: MIDEA ROBOZONE TECHNOLOGY CO., LTD., Suzhou (CN)

(72) Inventors: Tao Sun, Suzhou (CN); Jiying Ren, Suzhou (CN); Lin Shao, Suzhou (CN); Sunchun Zhou, Suzhou (CN); Cong Wang, Suzhou (CN)

(73) Assignee: MIDEA ROBOZONE TECHNOLOGY CO., LTD., Suzhou (CN)

( * ) Notice: Subject to any disclaimer, the term of this patent is extended or adjusted under 35 U.S.C. 154(b) by 427 days.

(21) Appl. No.: 18/708,598

(22) PCT Filed: Dec. 2, 2021

(86) PCT No.: PCT/CN2021/134980
§ 371 (c)(1),
(2) Date: May 9, 2024

(87) PCT Pub. No.: WO2023/082381
PCT Pub. Date: May 19, 2023

(65) Prior Publication Data
US 2025/0000320 A1 Jan. 2, 2025

(30) Foreign Application Priority Data
Nov. 9, 2021 (CN) .......................... 202111321411.7

(51) Int. Cl.
*A47L 11/40* (2006.01)
*B25J 9/16* (2006.01)

(52) U.S. Cl.
CPC ......... *A47L 11/4011* (2013.01); *B25J 9/1664* (2013.01); *A47L 2201/06* (2013.01)

(58) Field of Classification Search
CPC ............. A47L 11/4011; A47L 2201/04; A47L 2201/06; B25J 9/1664
See application file for complete search history.

(56) References Cited

U.S. PATENT DOCUMENTS

2009/0048727 A1 2/2009 Hong et al.
2019/0061156 A1 2/2019 Li et al.
(Continued)

FOREIGN PATENT DOCUMENTS

CN 107544507 A 1/2018
CN 107544517 A 1/2018
(Continued)

OTHER PUBLICATIONS

ISR received in PCT/CN2021/134980; mailed Jul. 27, 2022.
(Continued)

*Primary Examiner* — Andrew A Horton
(74) *Attorney, Agent, or Firm* — K&L Gates LLP

(57) ABSTRACT

The present disclosure discloses a method and a device for controlling a cleaning robot, a cleaning robot, and a storage medium. The method include: acquiring an edge cleaning trajectory of the cleaning robot marked on a grid map; determining a central area grid associated with the cleaning robot in real time; and controlling the cleaning robot to exit an edge cleaning state in response to determining a repeated section of edge cleaning of the cleaning robot based on the edge cleaning trajectory and the central area grid. Compared to the related art, the present disclosure enables the cleaning robot to exit the edge cleaning state in time, avoiding repeated edge cleaning and improving the cleaning efficiency.

20 Claims, 3 Drawing Sheets

(56) References Cited

U.S. PATENT DOCUMENTS

| | | | |
|---|---|---|---|
| 2020/0275814 A1 | 9/2020 | Jo | |
| 2020/0345192 A1* | 11/2020 | Zhu | A47L 9/2831 |
| 2021/0219803 A1 | 7/2021 | Lee et al. | |

FOREIGN PATENT DOCUMENTS

| | | |
|---|---|---|
| CN | 107703930 A | 2/2018 |
| CN | 107913039 A | 4/2018 |
| CN | 108196555 A | 6/2018 |
| CN | 109953700 A | 7/2019 |
| CN | 111399524 A | 7/2020 |
| CN | 111596662 A | 8/2020 |

OTHER PUBLICATIONS

The First Office Action received in the counterpart Chinese Application 202111321411.7, mailed on Feb. 8, 2025, 10 pages with English translation.

The extended European search report received in the counterpart EP application 21963819.4, mailed on Feb. 3, 2025, 7 pages.

* cited by examiner

CLEANING ROBOT CONTROL METHOD AND APPARATUS, CLEANING ROBOT, AND STORAGE MEDIUM

CROSS-REFERENCES TO RELATED APPLICATIONS

The present disclosure is a national phase application of International Application No. PCT/CN2021/134980, filed on Dec. 2, 2021, which claims a priority to Chinese Patent Application No. 202111321411.7 filed on Nov. 9, 2021, the entire contents of which are incorporated herein by reference.

FIELD

The present disclosure relates to the field of household appliance technologies, and more particularly, to a method and a device for controlling a cleaning robot, a cleaning robot, and a storage medium.

BACKGROUND

Sweeper, also known as automatic cleaning machines, intelligent vacuum cleaners, cleaning robots, etc., are intelligent household appliances with artificial intelligence that can complete floor cleaning work in a room automatically. Nowadays, the sweeper has gradually become an indispensable intelligent assistant in people's lives.

When the cleaning robot performs coverage cleaning on an area to be cleaned, due to the presence of a low obstacle in the area, the cleaning robot may collide with the obstacle and perform edge cleaning around the obstacle. The edge cleaning may be performed on the obstacle once and this isolated area may be marked, which prevents the edge cleaning from being performed again in this area when the cleaning robot is under navigation or performs coverage cleaning. However, the cleaning robot may be guided to the area where the edge cleaning has been performed, due to dynamic obstacles or performing the edge cleaning in other areas. If there is no intervention in this case, the cleaning robot may clean the same obstacle again or even many times, thus reducing the cleaning efficiency of the cleaning robot.

SUMMARY

In view of the above problems, embodiments of the present disclosure provide a method and a device for controlling a cleaning robot, a cleaning robot, and a storage medium to improve cleaning efficiency of the cleaning robot.

In one embodiment of a first aspect of the present disclosure, a method for controlling a cleaning robot is provided. The method includes: acquiring an edge cleaning trajectory of the cleaning robot marked on a grid map constructed with respect to a target area; determining a central area grid associated with the cleaning robot in real time, the central area grid being a grid covered by a central area of the cleaning robot on the grid map and the central area grid including a first number of grids; and controlling the cleaning robot to exit an edge cleaning state in response to determining a repeated section of edge cleaning of the cleaning robot based on the edge cleaning trajectory and the central area grid.

According to the method for controlling the cleaning robot in the embodiment of the first aspect of the present disclosure, the edge cleaning trajectory marked by the cleaning robot on the grid map is acquired. The central area grid associated with the cleaning robot is determined in real time. The cleaning robot is controlled to exit the edge cleaning state in response to determining a repeated section of edge cleaning of the cleaning robot based on the edge cleaning trajectory and the central area grid. Compared to the related art, the present disclosure enables the cleaning robot to exit the edge cleaning state in time, avoiding repeated edge cleaning and improving the cleaning efficiency.

In a possible implementation mode, according to the above method for controlling the cleaning robot provided in the present disclosure, the determining a repeated section of edge cleaning of the cleaning robot based on the edge cleaning trajectory and the central area grid includes determining a repeated section of edge cleaning of the cleaning robot in response to a presence of at least one overlapped grid between the central area grid and the edge cleaning trajectory and a count of the at least one overlapped grid being greater than or equal to a preset threshold value.

In a possible implementation mode, according to the above method for controlling the cleaning robot provided in the present disclosure, the determining the central area grid associated with the cleaning robot in real time includes updating the central area grid associated with the cleaning robot each time in response to the cleaning robot moves by one grid.

In a possible implementation mode, according to the above method for controlling the cleaning robot provided in the present disclosure, the determining a repeated section of edge cleaning of the cleaning robot based on the edge cleaning trajectory and the central area grid includes: determining a coverage score in response to a presence of at least one overlapped grid between the central area grid and the edge cleaning trajectory, the coverage score being a ratio of the count of the at least one overlapped grid to the first number; and determining a repeated section of edge cleaning of the cleaning robot in response to at least two adjacent coverage scores being greater than or equal to a preset coverage score threshold.

In a possible implementation mode, according to the above method for controlling the cleaning robot provided in the present disclosure, the determining a repeated section of edge cleaning of the cleaning robot based on the edge cleaning trajectory and the central area grid includes: determining a coverage score in response to a presence of at least one overlapped grid between the central area grid and the edge cleaning trajectory; determining a total coverage score based on a difference between a current coverage score and a prior coverage score; and determining a repeated section of edge cleaning of the cleaning robot in response to the total coverage score being greater than a preset total coverage score threshold.

In a possible implementation mode, according to the above method for controlling the cleaning robot provided in the present disclosure, the determining the total coverage score based on the difference between the current coverage score and the prior coverage score includes: determining a latest updated total coverage score; and determining a sum of the current coverage score and the latest updated total coverage score as a present updated total coverage score in response to the difference between the current coverage score and the prior coverage score being smaller than or equal to a preset difference threshold.

In a possible implementation mode, according to the above method for controlling the cleaning robot provided in the present disclosure, the determining the total coverage score based on the difference between the current coverage score and the prior coverage score includes: determining a latest updated total coverage score; taking a result, obtained by subtracting the prior coverage score from the latest updated total coverage score, as a present updated total coverage score in response to the difference between the current coverage score and the prior coverage score being greater than a preset difference threshold; and recording the present updated total coverage score as 0 in response to the result, obtained by subtracting the prior coverage score from the latest updated total coverage score, being smaller than or equal to 0.

In one embodiment of a second aspect of the present disclosure, a device for controlling a cleaning robot is provided. The device includes: an acquisition module configured to acquire an edge cleaning trajectory of the cleaning robot marked on a grid map constructed with respect to a target area; a determination module configured to determine a central area grid associated with the cleaning robot in real time, the central area grid being a grid covered by a central area of the cleaning robot on the grid map and the central area grid including a first number of grids; and a control module configured to control the cleaning robot to exit an edge cleaning state in response to determining a repeated section of edge cleaning of the cleaning robot based on the edge cleaning trajectory and the central area grid.

According to the device for controlling the cleaning robot in the embodiment of the second aspect of the present disclosure, the edge cleaning trajectory marked by the cleaning robot on the grid map is acquired. The central area grid associated with the cleaning robot is determined in real time. The cleaning robot is controlled to exit the edge cleaning state in response to determining a repeated section of edge cleaning of the cleaning robot based on the edge cleaning trajectory and the central area grid. Compared to the related art, the present disclosure enables the cleaning robot to exit the edge cleaning state in time, avoiding repeated edge cleaning and improving the cleaning efficiency.

In a possible implementation mode, according to the above device for controlling the cleaning robot provided in the present disclosure, the control module is configured to determine a repeated section of edge cleaning of the cleaning robot in response to a presence of at least one overlapped grid between the central area grid and the edge cleaning trajectory and the count of the at least one overlapped grid being greater than or equal to a preset threshold value.

In a possible implementation mode, according to the above device for controlling the cleaning robot provided in the present disclosure, the determination module is further configured to update the central area grid associated with the cleaning robot each time the cleaning robot moves by one grid.

In a possible implementation mode, according to the above device for controlling the cleaning robot provided in the present disclosure, the control module is further configured to: determine a coverage score in response to a presence of at least one overlapped grid between the central area grid and the edge cleaning trajectory, the coverage score being a ratio of the count of the at least one overlapped grid to the first number; and determine a repeated section of edge cleaning of the cleaning robot in response to at least two adjacent coverage scores being greater than or equal to a preset coverage score threshold.

In a possible implementation mode, according to the above method for controlling the cleaning robot provided in the present disclosure, the control module is further configured to: determine a coverage score in response to a presence of at least one overlapped grid between the central area grid and the edge cleaning trajectory; determine a total coverage score based on a difference between a current coverage score and a prior coverage score; and determine a repeated section of edge cleaning of the cleaning robot in response to the total coverage score being greater than a preset total coverage score threshold.

In a possible implementation mode, according to the above method for controlling the cleaning robot provided in the present disclosure, the control module is further configured to: determine a latest updated total coverage score; and determine a sum of the current coverage score and the latest updated total coverage score as a present updated total coverage score in response to the difference between the current coverage score and the prior coverage score being smaller than or equal to a preset difference threshold.

In a possible implementation mode, according to the above method for controlling the cleaning robot provided in the present disclosure, the control module is further configured to: determine a latest updated total coverage score; take a result, obtained by subtracting the prior coverage score from the latest updated total coverage score, as a present updated total coverage score in response to the difference between the current coverage score and the prior coverage score being greater than a preset difference threshold; and record the present updated total coverage score as 0 in response to the result, obtained by subtracting the prior coverage score from the latest updated total coverage score, being smaller than or equal to 0.

In one embodiment of a third aspect of the present disclosure, a cleaning robot is provided. The cleaning robot includes a memory, a processor, and a computer program stored in the memory and executable on the processor. The processor, when executing the computer program, implements the method for controlling the cleaning robot according to the above embodiment of the first aspect.

In one embodiment of a fourth aspect of the present disclosure, a computer-readable storage medium is provided. The storage medium has a computer-readable instruction stored thereon. The computer-readable instruction, when executed by a processor, implements the method for controlling the cleaning robot according to the above embodiment of the first aspect.

BRIEF DESCRIPTION OF THE DRAWINGS

After reading the detailed description of embodiments given below there will be better understanding. The accompanying drawings are used for a purpose of illustrating the embodiments only, rather than limiting the present disclosure. Moreover, throughout the accompanying drawings, same elements are denoted by same reference numerals. In the accompanying drawings.

Objects, functional features and advantages of the present disclosure will be further described in conjunction with embodiments and with reference to the accompanying drawings.

DETAILED DESCRIPTION OF THE DISCLOSURE

Embodiments of the present disclosure will be clearly and completely described below in conjunction with accompanying drawings in the present disclosure. Obviously, the embodiments described below are only part of the embodiments of the present disclosure and are not all embodiments of the present disclosure.

It should be noted that all directional indications (such as up, down, left, right, front, rear, etc.) in the embodiment of the present disclosure are only used to explain the relative position relationship, motion situation, and the like between various components in a certain specific posture (as shown in the attached drawings). If the specific posture changes, the directional indication will change accordingly.

In addition, descriptions such as those referring to "first" and "second" in the present disclosure are only used for descriptive purposes, and cannot be understood as indicating or implying relative importance or implicitly indicating the number of the indicated features. Therefore, the features associated with "first" and "second" may explicitly or implicitly include at least one of the features. In the description of the present disclosure, "plurality" means at least two, such as two, three, unless otherwise expressly specified.

In the present disclosure, unless otherwise clearly specified and limited, terms such as "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. The specific meaning of the above-mentioned terms in the present disclosure may be understood according to specific circumstances.

In addition, the various embodiments of the present disclosure can be combined with each other. When the combination of the embodiments are mutually contradictory or cannot be implemented, it should be considered that such a combination of technical solutions does not exist and is not within the protection scope required by the present disclosure.

Figure 1:
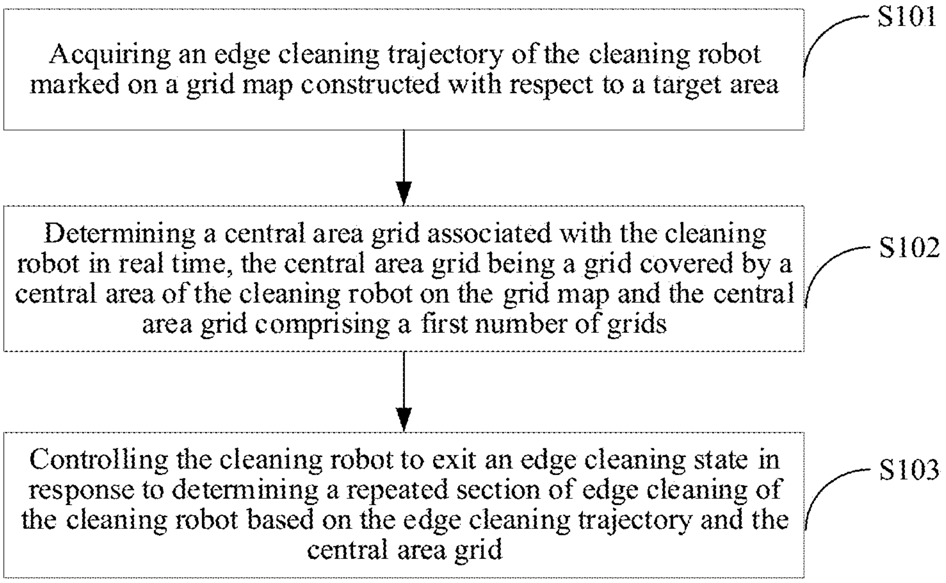
FIG. 1 shows a flowchart of a method for controlling a cleaning robot according to an embodiment of the present disclosure.

FIG. 1 shows a flowchart of a method for controlling a cleaning robot according to an embodiment of the present disclosure. As shown in FIG. 1, the method includes operations at the following blocks from S101 to S103.

At block S101, an edge cleaning trajectory of the cleaning robot marked on a grid map is acquired. The grid map is constructed by the cleaning robot with respect to a target area.

In an exemplary embodiment of the present disclosure, when the cleaning robot performs coverage cleaning on the target area, the cleaning robot performs autonomous navigation and map drawing. In the present disclosure, the cleaning robot draws the grid map on the target area, and performs edge cleaning on obstacles on the target area. In addition, the cleaning robot marks an edge-cleaned grid to form an edge cleaning trajectory, as shown in FIG. 2.

Each grid in the grid map described above may be represented by a unique identifier. For example, some identifiers indicate the presence of obstacles at these grids, and other identifiers indicate that the cleaning robot passes these grids along the edges.

At block S102, a central area grid associated with the cleaning robot is determined in real time. The central area grid is a grid covered by a central area of the cleaning robot on the grid map. The central area grid includes a first number of grids.

Figure 2:
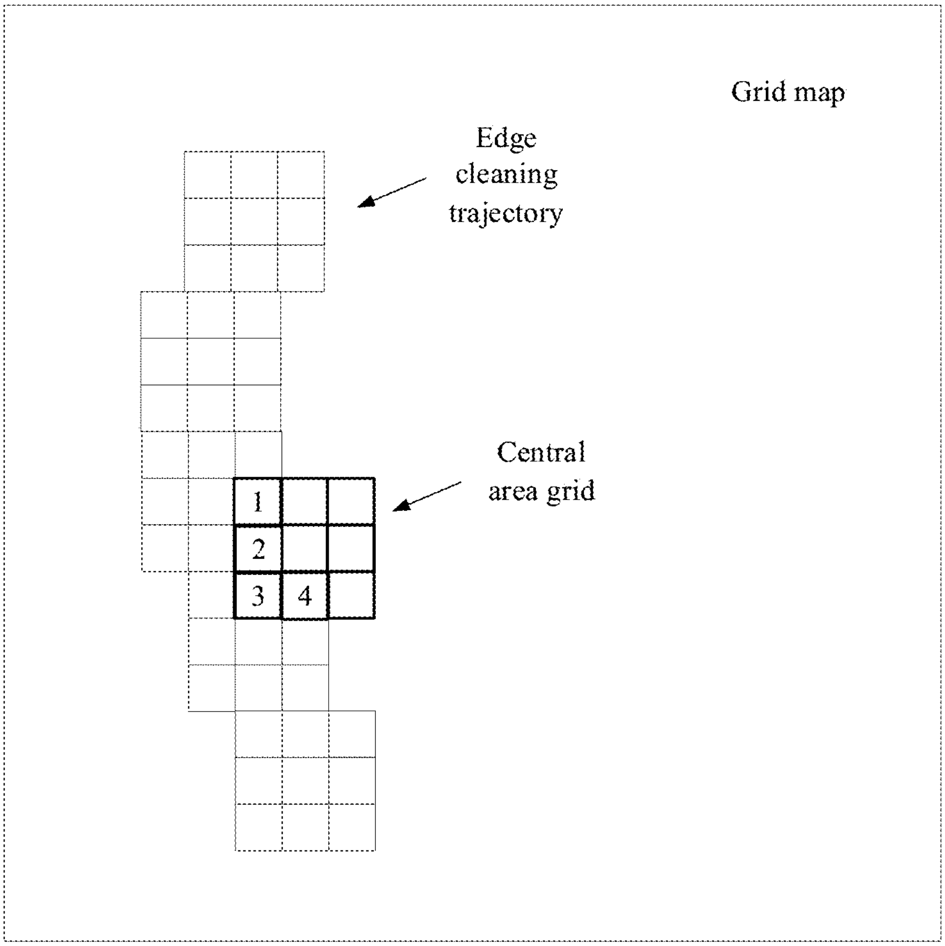
FIG. 2 shows a schematic view of a grid map according to an embodiment of the present disclosure.

As shown in FIG. 2, the first number may be 9, and the central area of the cleaning robot covers 9 grids on the grid map, including a center one and one in each of the 8 surrounding directions. That is, the cleaning robot is represented by 9 grid identifiers as shown in the figure on the grid map.

In a possible implementation mode, the step S102 may be implemented as updating the central area grid associated with the cleaning robot each time the cleaning robot moves by one grid.

In an exemplary embodiment of the present disclosure, every time the cleaning robot moves by one grid, the central area of the cleaning robot may recover 9 grids on the grid map, that is, the central area grid associated with the cleaning robot may be redetermined once.

At block S103, the cleaning robot is controlled to exit an edge cleaning state in response to determining a repeated section of edge cleaning of the cleaning robot based on the edge cleaning trajectory and the central area grid.

In a possible implementation mode, the step S103 may be implemented as determining a repeated section of edge cleaning of the cleaning robot in response to a presence of at least one overlapped grid between the central area grid associated with the cleaning robot and the edge cleaning trajectory and the count of the at least one overlapped grid being greater than or equal to a preset threshold value.

For example, the preset threshold value may be set to 3, as shown in FIG. 2, 4 overlapped grids present between the central area grid associated with the cleaning robot and the edge cleaning trajectory, which are 1, 2, 3, and 4 respectively. When the count of the overlapped grids is greater than 3, it may be determined a repeated section of edge cleaning of the cleaning robot due to some reasons. At this time, the cleaning robot may be controlled to exit the edge cleaning state, such as cleaning in another direction, avoiding repeated edge cleaning, and improving the cleaning efficiency.

To avoid over-sensitivity in determining repeated edge cleaning due to parameter problems, in another possible implementation mode, the step S103 may be implemented as: determining a coverage score in response to a presence of at least one overlapped grid between the central area grid associated with the cleaning robot and the edge cleaning trajectory, the coverage score being a ratio of the count of the at least one overlapped grid to the first number; and determining a repeated section of edge cleaning of the cleaning robot in response to at least two adjacent coverage scores being greater than or equal to a preset coverage score threshold.

For example, the preset coverage score threshold may be set to 3/9, as shown in FIG. 2, the coverage score is 4/9 when 4 overlapped grids present between the central area grid associated with the cleaning robot and the edge cleaning trajectory. When 5 overlapped grids present immediately in response to next determining the central area grid associated with the cleaning robot, the coverage score is 5/9. The adjacent two coverage scores are greater than 3/9, it may be determined a repeated section of edge cleaning of the cleaning robot. Therefore, an incorrect determination caused by only one comparison can be avoided. It may also be set that, a repeated section of edge cleaning of the cleaning robot is determine in response to three adjacent coverage scores being greater than 3/9, which is not limited in the present disclosure.

It is worth mentioning that the coverage score is 9/9=1 when the central area grid associated with the cleaning robot and the edge cleaning trajectory are all overlapped. The coverage score is 0/9=0 when the central area grid associated with the cleaning robot and the edge cleaning trajectory are not overlapped.

Figure 3:
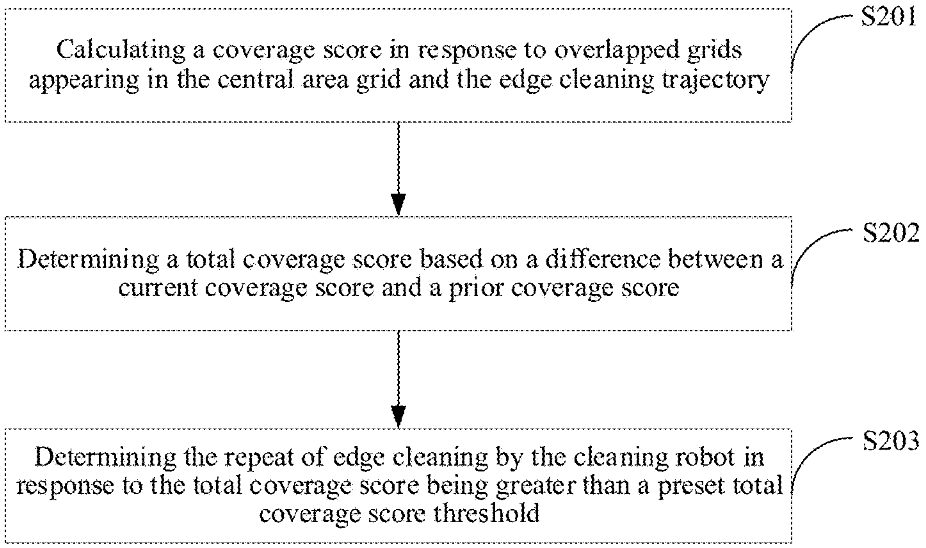
FIG. 3 shows a flowchart of S103 according to an embodiment of the present disclosure.

In another possible implementation mode, to avoid oversensitivity in determining repeated edge cleaning due to parameter problems, as shown in FIG. 3, the step S103 may be implemented as following S201 to S203.

At block S201, a coverage score is determined in response to a presence of at least one overlapped grid between the central area grid associated with the cleaning robot and the edge cleaning trajectory.

At block S202, a total coverage score is determined based on a difference between a current coverage score and a prior coverage score.

At block S203, a repeated section of edge cleaning of the cleaning robot is determined in response to the total coverage score being greater than a preset total coverage score threshold.

In an exemplary embodiment of the present disclosure, the total coverage score may be understood as a total length of the repeated edge cleaning of the cleaning robot. The preset total coverage score threshold may be understood as the tolerance for the total length of the repeated edge cleaning of the cleaning robot. For example, the preset total coverage score threshold may be set to 12.1, corresponding to an actual edge cleaning distance of about 50 centimeters. When the tolerance is exceeded, a repeated section of edge cleaning of the cleaning robot is determined.

Figure 4:
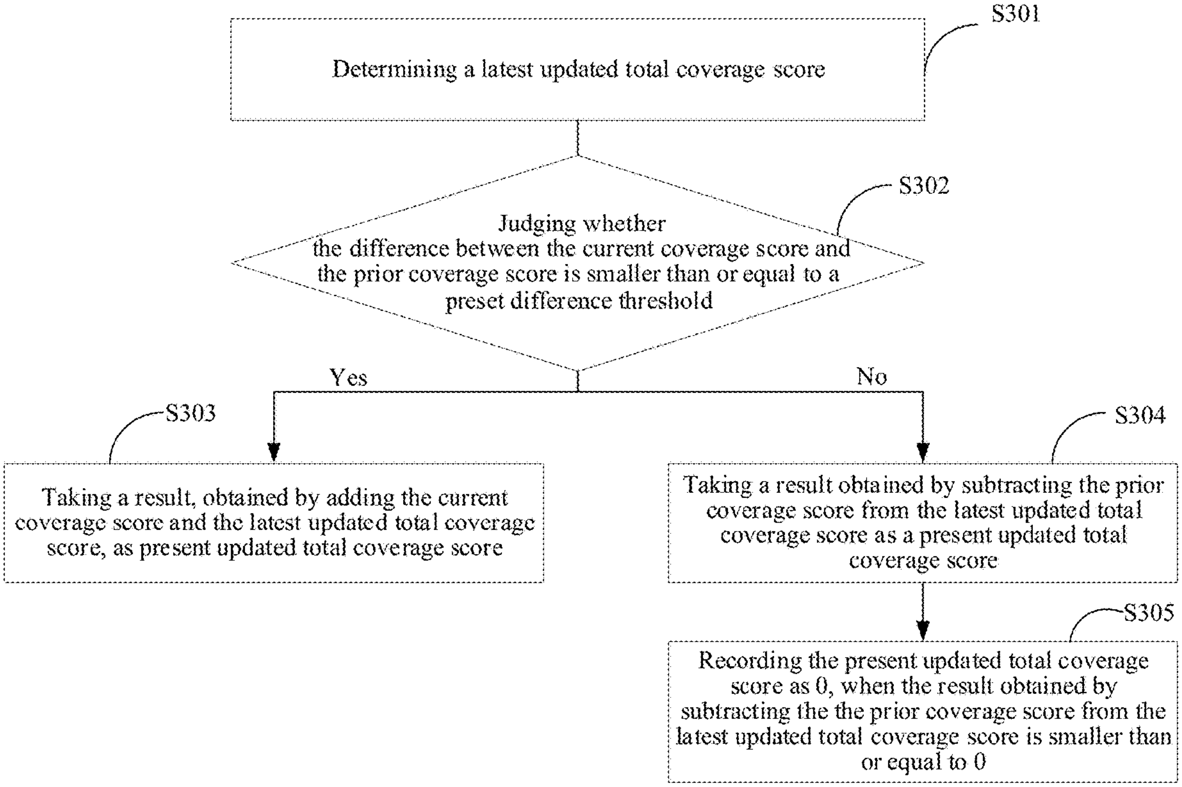
FIG. 4 shows a flowchart of S202 according to an embodiment of the present disclosure.

In an exemplary embodiment of the present disclosure, as shown in FIG. 4, the step S202 may include following operations S301 to S305.

At block S301, a latest updated total coverage score is determined. In an exemplary embodiment of the present disclosure, when it is the first update, the latest updated total coverage score is 0. When it is not the first update, the latest updated total coverage score is also updated through the following steps, which is a cyclic process.

At block S302, whether the difference between the current coverage score and the prior coverage score is smaller than or equal to a preset difference threshold is determined.

At block S303, when the difference between the current coverage score and the prior coverage score is smaller than or equal to the preset difference threshold, a sum of the current coverage score and the latest updated total coverage score is determined as a present updated total coverage score.

It can be understood that when the difference between the current coverage score and the prior coverage score is small. That is, when the count of current overlapped grids is close to the count of prior overlapped grids, it is considered that the cleaning robot continuously repeats the edge cleaning. When the total coverage score is greater than the present total coverage score threshold, a repeated section of edge cleaning of the cleaning robot may be determined.

For example, when the prior coverage score is 1, the preset difference threshold is set to 0.2 times of the prior coverage score, i.e., 0.2. When the current coverage score is 1 and the difference between the prior coverage score and the current coverage score is 0, which is smaller than 0.2, the current coverage score of 1 is added to the latest updated total coverage score of 12 to get the present updated total coverage score of 13, which is greater than the preset total coverage score threshold of 12.1. Then, a repeated section of edge cleaning of the cleaning robot may be determined.

In practice, the coverage score is a fraction only when the cleaning robot first enters or exits the edge cleaning trajectory. In most cases, the coverage score is 1 or 0. Therefore, a situation where the coverage score is consistently a fraction and cumulatively exceeds the preset total coverage score threshold is highly improbable.

At block S304, when the difference between the current coverage score and the prior coverage score is greater than a preset difference threshold, a result obtained by subtracting the prior coverage score from the latest updated total coverage score is taken as a present updated total coverage score.

At block S305, when the result obtained by subtracting the prior coverage score from the latest updated total coverage score is smaller than or equal to 0, the present updated total coverage score is recorded as 0.

For example, the prior coverage score is 1, and the present difference threshold is set to 0.2. When the current coverage score is 4/9, the difference between the current coverage score and the prior coverage score is 5/9, which is greater than 0.2. Then the prior coverage score of 1 is subtracted from the latest updated total coverage score of 12 to get the present updated total coverage score of 11, which is smaller than the preset total coverage score threshold of 12.1. Therefore, the cleaning robot cannot be determined to be in repeated edge cleaning. When an adjacent total coverage score begins to be the same and is smaller than the preset total coverage score threshold, the cleaning robot is no longer accumulating or subtracting coverage scores, that is, the cleaning robot does not repeat the edge cleaning, and the total coverage score is set to 0.

In the method, the cleaning robot marks an edge of the area to be cleaned, and determines a current edge state based on the previous edge cleaning trajectory. Therefore, the cleaning robot avoids repeated edge cleaning due to collisions at the same position.

According to the method for controlling the cleaning robot in the embodiment of the present disclosure, the edge cleaning trajectory marked by the cleaning robot on the grid map is acquired. The central area grid associated with the cleaning robot is determined in real time. The cleaning robot is controlled to exit the edge cleaning state in response to determining a repeated section of edge cleaning of the cleaning robot based on the edge cleaning trajectory and the central area grid. Compared to the related art, the present disclosure enables the cleaning robot to exit the edge cleaning state in time, avoiding repeated edge cleaning and improving the cleaning efficiency.

The embodiments of the present disclosure further provides the device for controlling the cleaning robot corresponding to the above method for controlling the cleaning robot. Relevant parts may refer to part of the description of the foregoing embodiments, and the method embodiment described below is merely illustrative.

Figure 5:
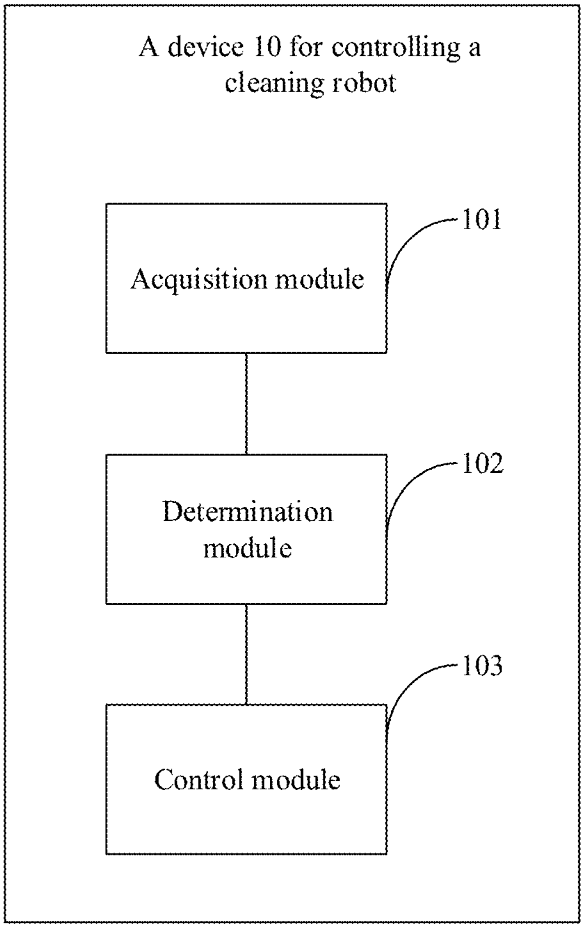
FIG. 5 shows a schematic diagram of a device for controlling a cleaning robot according to an embodiment of the present disclosure.

FIG. 5 shows a schematic diagram of the device for controlling the cleaning robot according to an embodiment of the present disclosure. As shown in FIG. 5, a device 10 for controlling the cleaning robot includes an acquisition module 101, a determination module 102, and a control module 103.

The acquisition module 101 is configured to acquire an edge cleaning trajectory of the cleaning robot marked on a grid map constructed with respect to a target area.

The determination module 102 is configured to determine a central area grid associated with the cleaning robot in real time. The central area grid is a grid covered by a central area of the cleaning robot on the grid map and the central area grid includes a first number of grids.

The control module 103 is configured to control the cleaning robot to exit an edge cleaning state in response to determining a repeated section of edge cleaning of the cleaning robot based on the edge cleaning trajectory and the central area grid.

In a possible implementation mode, according to the above device for controlling the cleaning robot provided in the present disclosure, the control module 103 is configured to determine a repeated section of edge cleaning of the cleaning robot in response to a presence of at least one overlapped grid between the central area grid and the edge cleaning trajectory and the count of the at least one overlapped grid being greater than or equal to a preset threshold value.

In a possible implementation mode, according to the above device for controlling the cleaning robot provided in the present disclosure, the determination module 102 is further configured to update the central area grid associated with the cleaning robot each time the cleaning robot moves by one grid.

In a possible implementation mode, according to the above device for controlling the cleaning robot provided in the present disclosure, the control module 103 is further configured to: determine a coverage score in response to a presence of at least one overlapped grid between the central area grid and the edge cleaning trajectory, the coverage score being a ratio of the count of the at least one overlapped grid to the first number; and determine a repeated section of edge cleaning of the cleaning robot in response to at least two adjacent coverage scores being greater than or equal to a preset coverage score threshold.

In a possible implementation mode, according to the above method for controlling the cleaning robot provided in the present disclosure, the control module 103 is further configured to: determine a coverage score in response to a presence of at least one overlapped grid between the central area grid and the edge cleaning trajectory; determine a total coverage score based on a difference between a current coverage score and a prior coverage score; and determine a repeated section of edge cleaning of the cleaning robot in response to the total coverage score being greater than a preset total coverage score threshold.

In a possible implementation mode, according to the above method for controlling the cleaning robot provided in the present disclosure, the control module 103 is further configured to: determine a latest updated total coverage score; and determine a sum of the current coverage score and the latest updated total coverage score as a present updated total coverage score in response to the difference between the current coverage score and the prior coverage score being smaller than or equal to a preset difference threshold.

In a possible implementation mode, according to the above method for controlling the cleaning robot provided in the present disclosure, the control module 103 is further configured to: determine a latest updated total coverage score; take a result, obtained by subtracting the prior coverage score from the latest updated total coverage score, as a present updated total coverage score in response to the difference between the current coverage score and the prior coverage score being greater than a preset difference threshold; and record the present updated total coverage score as 0 in response to the result, obtained by subtracting the prior coverage score from the latest updated total coverage score, being smaller than or equal to 0.

According to the device for controlling the cleaning robot in the embodiment of the present disclosure, the edge cleaning trajectory marked by the cleaning robot on the grid map is acquired. The central area grid associated with the cleaning robot is determined in real time. The cleaning robot is controlled to exit the edge cleaning state in response to determining a repeated section of edge cleaning of the cleaning robot based on the edge cleaning trajectory and the central area grid. Compared to the related art, the present disclosure enables the cleaning robot to exit the edge cleaning state in time, avoiding repeated edge cleaning and improving the cleaning efficiency.

Figure 6:
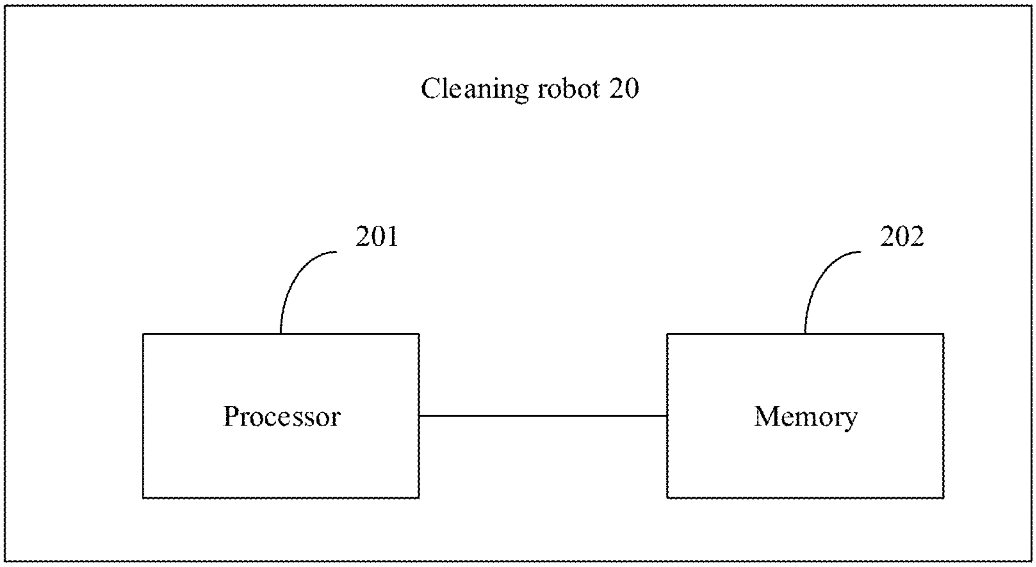
FIG. 6 shows a schematic diagram of a cleaning robot according to an embodiment of the present disclosure.

As shown in FIG. 6, the embodiment of the present disclosure further provides a cleaning robot 20, including a memory 201, a processor 202, and a computer program stored in the memory and executable on the processor. The processor 202, when executing the computer program, implements the method for controlling the cleaning robot according to any one of the above embodiments.

In an exemplary embodiment of the present disclosure, the cleaning robot may include a processor, a memory, a bus, and a communication interface. The processor, the communication interface, and the memory are connected through the bus. The memory stores a computer program executable on the processor. The processor, when executing the computer program, implements the method for controlling the cleaning robot according to any one of the above embodiments.

The memory may include a high-speed random access memory (RAM), and may also include a non-volatile memory, such as at least one disk memory. A communication connection between this system network element and at least one other network element is realized through at least one communication interface (which may be wired or wireless), either using the Internet, a wide area network, a local area network, a metropolitan area network, and so on.

The bus may be an ISA bus, a PCI bus, or an EISA bus, etc. The bus may be classified as an address bus, a data bus, a control bus, and the like. The memory is configured to store a program. The processor executes the program in response to receiving an execution instruction. The method for controlling the cleaning robot disclosed in any of the foregoing embodiments of the present disclosure may be applied to the processor or implemented by the processor.

The processor may be an integrated circuit chip having signal processing capabilities. In an implementation, actions of the above method may be accomplished by an integrated logic circuit in hardware in the processor or by instructions in the form of software. The above processor may be a general-purpose processor, including a Central Processing Unit (CPU), a Network Processor (NP), etc.; and may further be a Digital Signal Processor (DSP), an Application Specific Integrated Circuit (ASIC), a Field-Programmable Gate Array (FPGA) or other programmable logic devices, a discrete gate or a transistor logic device, and a discrete hardware component. The method, actions, and logic block diagrams according to any of the embodiments of the present disclosure may be implemented or performed. The general-purpose processor may be a microprocessor, or the processor may further be any conventional processor, etc. The actions of the method disclosed in combination with any of the embodiments of the present disclosure may be directly embodied as being performed by a hardware decoding processor or being performed by a combination of a hardware module and a software module in a decoding processor. The software module may be located in a random memory, a flash memory, a read-only memory, a programmable read-only memory or an electrically erasable programmable memory, a register, and other mature storage media in the art. The storage medium is located in the memory. The processor reads information in the memory and completes the actions of the above method in combination with the hardware.

The cleaning robot provided by the embodiments of the present disclosure and the method for controlling the cleaning robot provided by the embodiments of the present disclosure have the same embodiments, and have the same beneficial effects as the methods adopted, operated or realized by the same.

The embodiments of the present disclosure further provide a computer-readable storage medium having a computer-readable instruction (i.e., a program product) stored thereon. The computer-readable instruction, when executed by a processor, implements the method for controlling the cleaning robot of any one of the above embodiments.

Examples of the computer-readable storage medium include, but are not limited to, a Phase-Change Memory (PRAM), a Static RAM (SRAM), a Dynamic RAM (DRAM), other types of RAMs, a Read-Only Memory (ROM), an Electrically Erasable Programmable Read-Only Memory (EEPROM), a flash memory or other memory technologies, or a magnetic storage medium, which will not be repeated here.

The computer-readable storage medium provided in the above embodiments of the present disclosure has the same embodiments as the method for controlling the cleaning robot provided in the embodiments of the present disclosure, and has the same beneficial effects as the method adopted, operated or implemented by the application program stored therein.

A great number of specific details are provided here. However, it is readily understood that the embodiments of the present disclosure may be implemented without these details. In some embodiment, the method, structure, and technology well known in the art may not be illustrated, to not obscure understanding of the present disclosure.

Similarly, it is ready understood that for simplifying the present disclosure and facilitating understanding one or several aspects of the present disclosure, in the above description of exemplary embodiments of this disclosure, each feature sometimes may be grouped into a single embodiment, drawing or corresponding description. However, the disclosed method should not be interpreted as reflecting the intention that more features should be included in the present disclosure, compared with those in the claims. Specifically, as illustrated in the claims, the present disclosure may be used to solve problem(s) corresponding to a feature used in an embodiment. Therefore, claims following a specific embodiment are thus expressly incorporated into that specific embodiment, each of the claims may be used as an embodiment of the present disclosure.

The modules in the device of an embodiment may be adaptively changed and located in one or more devices different from the embodiment. The modules or units or components in the embodiments may be combined into one module or unit or component and, furthermore, may be divided into multiple sub-modules or sub-units or sub-components. Excepting that at least some of such features and/or processes or elements are mutually exclusive, all combinations of features disclosed here (including the annexed claims, abstract and drawings) may be applied without contradiction. Unless a clear illustration is given, equivalents of the same, identical or similar purpose may replace each of the features disclosed here (including the annexed claims, abstract and drawings).

Despite some features is included in some embodiment, not other features, combinations of features of different embodiments mean various embodiments of the present disclosure. For example, in the claims, any protected embodiment may be used with any combination.

Various component embodiments of the present disclosure may be implemented in hardware, or in software modules running on one or more processors, or in a combination thereof. A microprocessor or digital signal processor (DSP) may be used in practice to implement some or all of the functions of some or all of the components in the apparatus for creating virtual machines according to embodiments of the present disclosure. The present disclosure may also be embodied as apparatus or device programs (e.g., computer programs and computer program products) for performing part or all of the methods described herein. Such programs embodying the present disclosure may be stored on a computer readable medium or may be in the form of one or more signals. Such a signal may be downloaded from an Internet website, or provided on a carrier signal, or in any other form.

It is to be understood that the above embodiments illustrate rather than limit the present disclosure. In a claim, any reference symbol located between parentheses should not be constructed as a limitation of the claim. The word "includes" does not exclude the existence of elements or steps not listed in the claim. The word "one" or "a" before a component does not exclude the existence of multiple such components. This disclosure may be implemented by means of hardware including a number of different components and by means of a properly programmed computer. In a unit claim that lists several devices, several of these devices may be embodied by the same hardware item. The use of the words "first", "second", and "third" does not indicate any order. These words can be interpreted as names.

The above description is only an embodiment of the present disclosure, and does not limit the patent scope of the present disclosure. Any equivalent structural transformation made by using the contents of the description and drawings of the present disclosure under the concept of the present disclosure, or directly/indirectly applied to other related fields, is included in the patent protection scope of the present disclosure.

What is claimed is:

1. A method for controlling a cleaning robot, comprising:

acquiring an edge cleaning trajectory of the cleaning robot marked on a grid map constructed with respect to a target area;

determining a central area grid associated with the cleaning robot in real time, the central area grid being a grid covered by a central area of the cleaning robot on the grid map and the central area grid comprising a first number of grids; and controlling the cleaning robot to exit an edge cleaning state in response to determining a repeated section of edge cleaning of the cleaning robot based on the edge cleaning trajectory and the central area grid.

2. The method according to claim 1, wherein the determining the repeated section of edge cleaning of the cleaning robot based on the edge cleaning trajectory and the central area grid comprises:

determining the repeated section of edge cleaning of the cleaning robot in response to a presence of at least one overlapped grid between the central area grid and the edge cleaning trajectory and a count of the at least one overlapped grid being greater than or equal to a preset threshold value.

3. The method according to claim 1, wherein said determining the central area grid associated with the cleaning robot in real time comprises:

updating the central area grid associated with the cleaning robot each time the cleaning robot moves by one grid.

4. The method according to claim 3, wherein said determining the repeated section of edge cleaning of the cleaning robot based on the edge cleaning trajectory and the central area grid comprises:

determining a coverage score according to the at least one overlapped grid between the central area grid and the edge cleaning trajectory, the coverage score being a ratio of the count of the at least one overlapped grid to the first number; and determining the repeated section of edge cleaning of the cleaning robot in response to at least two adjacent coverage scores being greater than or equal to a preset coverage score threshold.

5. The method according to claim 3, wherein said determining the repeated section of edge cleaning of the cleaning robot based on the edge cleaning trajectory and the central area grid comprises:

determining a coverage score in response to a presence of at least one overlapped grid between the central area grid and the edge cleaning trajectory;

determining a total coverage score based on a difference between a current coverage score and a prior coverage score; and determining the repeated section of edge cleaning of the cleaning robot in response to the total coverage score being greater than a preset total coverage score threshold.

6. The method according to claim 5, wherein said determining the total coverage score based on the difference between the current coverage score and the prior coverage score comprises:

determining a latest updated total coverage score; and determining a sum of the current coverage score and the latest updated total coverage score as a present updated total coverage score in response to the difference between the current coverage score and the prior coverage score being smaller than or equal to a preset difference threshold.

7. The method according to claim 6, wherein said determining the total coverage score based on the difference between the current coverage score and the prior coverage score comprises:

determining a latest updated total coverage score;

taking a result, obtained by subtracting the prior coverage score from the latest updated total coverage score, as a present updated total coverage score in response to the difference between the current coverage score and the prior coverage score being greater than a preset difference threshold; and recording the present updated total coverage score as 0 in response to the result, obtained by subtracting the prior coverage score from the latest updated total coverage score, being smaller than or equal to 0.

8. A cleaning robot, comprising a memory, a processor, and a computer program stored in the memory and executable on the processor, wherein the processor, when executing the computer program, implements the method according to claim 1.

9. A device for controlling a cleaning robot, comprising:

an acquisition module configured to acquire an edge cleaning trajectory of the cleaning robot marked on a grid map constructed with respect to a target area;

a determination module configured to determine a central area grid associated with the cleaning robot in real time, the central area grid being a grid covered by a central area of the cleaning robot on the grid map and the central area grid comprising a first number of grids; and a control module configured to control the cleaning robot to exit an edge cleaning state in response to determining a repeated section of edge cleaning of the cleaning robot based on the edge cleaning trajectory and the central area grid.

10. The device according to claim 9, wherein the determining the repeated section of edge cleaning of the cleaning robot based on the edge cleaning trajectory and the central area grid comprises:

determining the repeated section of edge cleaning of the cleaning robot in response to a presence of at least one overlapped grid between the central area grid and the edge cleaning trajectory and a count of the at least one overlapped grid being greater than or equal to a preset threshold value.

11. The device according to claim 9, wherein said determining the central area grid associated with the cleaning robot in real time comprises:

updating the central area grid associated with the cleaning robot each time the cleaning robot moves by one grid.

12. The device according to claim 11, wherein said determining the repeated section of edge cleaning of the cleaning robot based on the edge cleaning trajectory and the central area grid comprises:

determining a coverage score according to the at least one overlapped grid between the central area grid and the edge cleaning trajectory, the coverage score being a ratio of the count of the at least one overlapped grid to the first number; and determining the repeated section of edge cleaning of the cleaning robot in response to at least two adjacent coverage scores being greater than or equal to a preset coverage score threshold.

13. The device according to claim 11, wherein said determining the repeated section of edge cleaning of the cleaning robot based on the edge cleaning trajectory and the central area grid comprises:

determining a coverage score in response to a presence of at least one overlapped grid between the central area grid and the edge cleaning trajectory;

determining a total coverage score based on a difference between a current coverage score and a prior coverage score; and determining the repeated section of edge cleaning of the cleaning robot in response to the total coverage score being greater than a preset total coverage score threshold.

14. A computer-readable storage medium for controlling a cleaning robot, having a computer-readable instruction stored thereon, wherein the computer-readable instruction, when executed by a processor, cause the processor to:

acquire an edge cleaning trajectory of the cleaning robot marked on a grid map constructed with respect to a target area;

determine a central area grid associated with the cleaning robot in real time, the central area grid being a grid covered by a central area of the cleaning robot on the grid map and the central area grid comprising a first number of grids; and control the cleaning robot to exit an edge cleaning state in response to determining a repeated section of edge cleaning of the cleaning robot based on the edge cleaning trajectory and the central area grid.

15. The computer-readable storage medium according to claim 14, wherein the determining the repeated section of edge cleaning of the cleaning robot based on the edge cleaning trajectory and the central area grid comprises:

determining the repeated section of edge cleaning of the cleaning robot in response to a presence of at least one overlapped grid between the central area grid and the edge cleaning trajectory and a count of the at least one overlapped grid being greater than or equal to a preset threshold value.

16. The computer-readable storage medium according to claim 14, wherein said determining the central area grid associated with the cleaning robot in real time comprises:

updating the central area grid associated with the cleaning robot each time the cleaning robot moves by one grid.

17. The computer-readable storage medium according to claim 16, wherein said determining the repeated section of edge cleaning of the cleaning robot based on the edge cleaning trajectory and the central area grid comprises:

determining a coverage score according to the at least one overlapped grid between the central area grid and the edge cleaning trajectory, the coverage score being a ratio of the count of the at least one overlapped grid to the first number; and determining the repeated section of edge cleaning of the cleaning robot in response to at least two adjacent coverage scores being greater than or equal to a preset coverage score threshold.

18. The computer-readable storage medium according to claim 16, wherein said determining the repeated section of edge cleaning of the cleaning robot based on the edge cleaning trajectory and the central area grid comprises:

determining a coverage score in response to a presence of at least one overlapped grid between the central area grid and the edge cleaning trajectory;

determining a total coverage score based on a difference between a current coverage score and a prior coverage score; and determining the repeated section of edge cleaning of the cleaning robot in response to the total coverage score being greater than a preset total coverage score threshold.

19. The computer-readable storage medium according to claim 18, wherein said determining the total coverage score based on the difference between the current coverage score and the prior coverage score comprises:

determining a latest updated total coverage score; and determining a sum of the current coverage score and the latest updated total coverage score as a present updated total coverage score in response to the difference between the current coverage score and the prior coverage score being smaller than or equal to a preset difference threshold.

20. The computer-readable storage medium according to claim 19, wherein said determining the total coverage score based on the difference between the current coverage score and the prior coverage score comprises:

determining a latest updated total coverage score;

taking a result, obtained by subtracting the prior coverage score from the latest updated total coverage score, as a present updated total coverage score in response to the difference between the current coverage score and the prior coverage score being greater than a preset difference threshold; and recording the present updated total coverage score as 0 in response to the result, obtained by subtracting the prior coverage score from the latest updated total coverage score, being smaller than or equal to 0.

* * * * *